US010008209B1

(12) United States Patent
Qian et al.

(10) Patent No.: US 10,008,209 B1
(45) Date of Patent: Jun. 26, 2018

(54) COMPUTER-IMPLEMENTED SYSTEMS AND METHODS FOR SPEAKER RECOGNITION USING A NEURAL NETWORK

(71) Applicant: Educational Testing Service, Princeton, NJ (US)

(72) Inventors: Yao Qian, San Francisco, CA (US); Jidong Tao, Lawrenceville, NJ (US); David Suendermann-Oeft, San Francisco, CA (US); Keelan Evanini, Pennington, NJ (US); Alexei V. Ivanov, Redwood City, NJ (US); Vikram Ramanarayanan, San Francisco, CA (US)

(73) Assignee: Educational Testing Service, Princeton, NJ (US)

( * ) Notice: Subject to any disclaimer, the term of this patent is extended or adjusted under 35 U.S.C. 154(b) by 0 days. days.

(21) Appl. No.: 15/273,830

(22) Filed: Sep. 23, 2016

Related U.S. Application Data

(60) Provisional application No. 62/232,561, filed on Sep. 25, 2015.

(51) Int. Cl.

| | |
|---|---|
| ***G10L 15/00*** | (2013.01) |
| ***G10L 17/18*** | (2013.01) |
| ***G10L 17/08*** | (2013.01) |
| ***G10L 17/20*** | (2013.01) |
| *G10L 15/16* | (2006.01) |

(52) U.S. Cl.
CPC .............. *G10L 17/18* (2013.01); *G10L 17/08* (2013.01); *G10L 17/20* (2013.01)

(58) Field of Classification Search
CPC .......... G10L 17/18; G10L 17/20; G10L 17/08
USPC ........................................ 704/202, 232, 259
See application file for complete search history.

(56) References Cited

U.S. PATENT DOCUMENTS 6,029,124 A * 2/2000 Gillick .................... G10L 15/08 704/200
2008/0153070 A1* 6/2008 Tyler .................... G09B 21/009 434/1
2015/0294670 A1* 10/2015 Roblek ................ G10L 17/005 704/232

OTHER PUBLICATIONS

Bengio, Yoshua; Learning Deep Architectures for AI; Foundations and Trends in Machine Learning, 2(1); pp. 1-127; 2009.

(Continued)

*Primary Examiner* — Thierry L Pham
(74) *Attorney, Agent, or Firm* — Jones Day

(57) ABSTRACT

Systems and methods are provided for providing voice authentication of a candidate speaker. Training data sets are accessed, where each training data set comprises data associated with a training speech sample of a speaker and a plurality of speaker metrics, where the plurality of speaker metrics include a native language of the speaker. The training data sets are used to train a neural network, where the data associated with each training speech sample is a training input to the neural network, and each of the plurality of speaker metrics is a training output to the neural network. Data associated with a speech sample is provided to the neural network to generate a vector that contains values for the plurality of speaker metrics, and the values contained in the vector are compared to values contained in a reference vector associated with a known person to determine whether the candidate speaker is the known person.

21 Claims, 8 Drawing Sheets

(56) References Cited

OTHER PUBLICATIONS

Bengio, Yoshua, Courville, Aaron, Vincent, Pascal; Representation Learning: A Review and New Perspective; IEEE Transactions on Pattern Analysis and Machine Intelligence, 35(8); pp. 1798-1828; Aug. 2013.
Cumani, Sandra, Laface, Pietro, Kulsoom, Farzana; Speaker Recognition by Means of Acoustic and Phonetically Informed GMMs; Proceedings of Interspeech; pp. 200-204; Sep. 2015.
Dehak, Najim, Kenny, Patrick, Dehak, Reda, Dumouchel, Pierre, Ouellet, Pierre; Front-End Factor Analysis for Speaker Verification; IEEE Transactions on Audio, Speech, and Language Processing, 19(4); pp. 788-798; May 2011.
Educational Testing Service; How ETS Protects the Integrity of the TOEFL Test; http://ww.ets.org/toefl/institutions; about/security.
Ghahabi, Omid, Hernando, Javier; i-Vector Modeling with Deep Belief Networks for Multi-Session Speaker Recognition; Odyssey 2014: The Speaker and Language Recognition Workshop; pp. 305-310; Jun. 2014.
Giri, Ritwik, Seltzer, Michael, Droppo, Jasha, Yu, Dong; Improving Speech Recognition in Reverberation Using a Room-Aware Deep Neural Network and Multi-Task Learning; Proceedings of IEEE International Conference on Acoustics, Speech, and Signal Processing; pp. 5014-5018; 2015.
Hinton, Geoffrey, Deng, Li, Yu, Dong, Dahl, George, Mohamed, Abdel-rahman, Jaitly, Navdeep, Senior, Andrew, Vanhoucke, Vincent, Nguyen, Patrick, Sainath, Tara, Kingsbury, Brian; Deep Neural Networks for Acoustic Modeling in Speech Recognition: The Shared Views of Four Research Groups; IEEE Signal Processing Magazine, 29(6); pp. 82-97; Nov. 2012.
Hinton, Geoffrey, Osindero, Simon, Teh, Yee-Whye; A Fast Learning Algorithm for Deep Belief Nets; Neural computation, 18(7); pp. 1527-1554; 2006.
Huang, Jui-Ting, Li, Jinyu, Yu, Dong, Deng, Li, Gong, Yifan; Cross-Language Knowledge Transfer Using Multilingual Deep Neural Network with Shared Hidden Layers; Proceedings of IEEE International Conference on Acoustics, Speech, and Signal Processing; pp. 7304-7308; 2013.
Ioffe, Sergey; Probabilistic Linear Discriminant Analysis; Computer Vision-ECCV 2006, Lecture Notes in Computer Science, 3954; pp. 531-542; 2006.
Kenny, Patrick, Gupta, Vishwa, Stafylakis, Themos, Ouellet, Pierre, Alam, Jahangir; Deep Neural Networks for Extracting Baum-Welch Statistics for Speaker Recognition; Proceedings of Odyssey 2014; pp. 293-298; 2014.
Kenny, Patrick, Ouellet, Pierre, Dehak, Najim, Gupta, Vishwa, Dumouchel, Pierre; A Study of Inter-Speaker Variability in Speaker Verification; IEEE Transactions on Audio, Speech, and Language Processing, 16(5); pp. 380-988; 2008.
Lei, Yun, Scheffer, Nicolas, Ferrer, Luciana, McLaren, Mitchell; A Novel Scheme for Speaker Recognition Using a Phonetically-Aware Deep Neural Network; Proceedings of IEEE ICASSP; pp. 1695-1699; 2014.
Povey, Daniel, Ghoshal, Amab, Boulianne, Gilles, Burget, Lukas, Glembek, Ondrej, Goel, Nagendra, Hannemann, Mirko, Motlicek, Petr, Qian, Yanmin, Schwarz, Petr, Silovsky, Jan, Stemmer, Georg, Vesely, Karel; The Kaldi Speech Recognition Toolkit; Proceedings of the ASRU Workshop; 2011.
Richardson, Fred, Reynolds, Doug, Dehak, Najim; A Unified Deep Neural Network for Speaker and Language Recognition; Proceedings of Interspeech; pp. 1146-1150; Sep. 2015.
Rumelhart, David, Hinton, Geoffrey, Williams, Ronald; Learning Representations by Back-Propagating Errors; Nature, 323; pp. 533-536; Oct. 1986.
Seide, Frank, Li, Gang, Yu, Dong; Conversational Speech Transcription Using Context-Dependent Deep Neural Networks; Proceedings of Interspeech; pp. 437-440; Aug. 2011.
Seide, Frank, Li, Gang, Chen, Xie, Yu, Dong; Feature Engineering in Context-Dependent Deep Neural Networks for Conversational Speech Transcription; Proceedings of IEEE ASRU; pp. 24-29; 2011.
Seltzer, Michael, Yu, Dong, Wang, Yongqiang; An Investigation of Deep Neural Networks for Noise Robust Speech Recognition; Proceedings of IEEE International Conference on Acoustics, Speech, and Signal Processing; pp. 7398-7402; 2013.
Seltzer, Michael, Droppo, Jasha; Multi-Task Learning in Deep Neural Networks for Improved Phoneme Recognition; IEEE International Conference on Acoustics, Speech, and Signal Processing; pp. 6965-6969; Oct. 2013.
Sharifian, Farzad; English as an International Language: Perspectives and Pedagogical Issues; Multilingual Matters: Bristol, UK; 2009.
Stafylakis, Themos, Kenny, Patrick, Senoussaoui, Mohammed, Dumouchel, Pierre; Preliminary Investigation of Boltzmann Machine Classifiers for Speaker Recognition; Proceedings of Odyssey Speaker and Language Recognition Workshop; 2012.
Vasilakakis, Vasileios, Cumani, Sandro, Laface, Pietro; Speaker Recognition by means of Deep Belief Networks; Biometrix Technologies in Forensic Science; 2013.
Vesely, Karel, Karafiat, Martin, Grezl, Frantisek; Convolutive Bottleneck Network Features for LVCSR; Proceedings of IEEE Workshop on Automatic Speech Recognition and Understanding; pp. 42-47; Dec. 2011.
Vesely, Karel, Karafiat, Martin, Grezl, Frantisek, Janda, Milos, Egorova, Ekaterina; The Language-Independent Bottleneck Features; Proceedings of IEEE Workshop on Spoken Language Technology; pp. 336-341; Dec. 2012.
Wang, Jun, Wang, Dong, Zhu, Ziwei, Zheng, Thomas Fang, Soong, Frank; Discriminative Scoring for Speaker Recognition Based on I-Vectors; Proceedings of APSIPA; pp. 1-5; 2014.
Yamada, Takanori, Wang, Longbiao, Kai, Atsuhiko; Improvement of Distant-Talking Speaker Identification Using Bottleneck Features of DNN; Proceedings of Interspeech; pp. 3661-3664; 2013.
Yan, Zhi-Jie, Huo, Qiang, Xu, Jian; A Scalable Approach to Using DNN-Derived Features in GMM-HMM Based Acoustic Modeling for LVCSR; Proceedings of Interspeech; pp. 104-108; 2013.
Yu, Dong, Eversole, Adam, Seltzer, Michael, Yao, Kaisheng, Huang, Zhiheng, Guenter, Brian, Kuchaiev, Oleksii, Zhang, Yu, Seide, Frank, Wang, Huaming, Droppo, Jasha, Zweig, Geoffrey, Rossbach, Chris, Currey, Jon, Gao, Jie, May, Avner, Peng, Baolin, Stolcke, Andreas, Slaney, Malcolm; An Introduction to Computational Networks and the Computational Network Toolkit; Microsoft Technical Report, MSR-TR-2014-112; 2014.
Zhang, Yu, Chuangsuwanich, Ekapol, Glass, James; Extracting Deep Neural Network Bottleneck Features Using Low-Rank Matrix Factorization; IEEE International Conference on Acoustic, Speech and Signal Processing; pp. 185-189; 2014.
Zheng, Hao, Zhang, Shanshan, Liu, Wenju; Exploring Robustness of DNN/RNN for Extracting Speaker Baum-Welch Statistics in Mismatched Conditions; Proceedings of Interspeech; pp. 1161-1165; Sep. 2015.

* cited by examiner

COMPUTER-IMPLEMENTED SYSTEMS AND METHODS FOR SPEAKER RECOGNITION USING A NEURAL NETWORK

CROSS-REFERENCE TO RELATED APPLICATIONS

This application claims priority to U.S. Provisional Application No. 62/232,561, entitled "Metadata Sensitive Bottleneck Features for Speaker Recognition," filed Sep. 25, 2015, the entirety of each of which is incorporated herein by reference.

FIELD

The technology described in this patent document relates generally to speaker-based security and more particularly to the use of neural networks for performing speaker-based security.

BACKGROUND

Voice biometrics can be applied to detect fraudulent activity in language proficiency tests to enhance test security—thereby protecting the integrity of tests and ensuring valid test scores. Systems and methods as described herein provide voice biometric capabilities using a trained neural network to generate vectors of speaker metrics that can be compared across vectors associated with a number of known speakers to determine whether a candidate speaker is who they say they are, or to determine that the candidate speaker is not someone who is known to participate in fraudulent behavior. In addition to examination test security, such systems and methods can be used in other voice biometric applications, such as banking and other security identifications.

SUMMARY

Systems and methods are provided for providing voice authentication of a candidate speaker. Training data sets are accessed, where each training data set comprises data associated with a training speech sample of a speaker and a plurality of speaker metrics, where the plurality of speaker metrics include a native language of the speaker. The training data sets are used to train a neural network, where the data associated with each training speech sample is a training input to the neural network, and each of the plurality of speaker metrics is a training output to the neural network. A speech sample of a candidate speaker is received. Data associated with the speech sample is provided to the neural network to generate a vector that contains values for the plurality of speaker metrics that includes a native language value for the candidate speaker based on the speech sample, and the values contained in the vector are compared to values contained in a reference vector associated with a known person to determine whether the candidate speaker is the known person.

As another example, a system for implementing a system for providing voice authentication of a candidate speaker includes a processing system that includes one or more data processors and a computer-readable medium encoded with instructions for commanding the processing system to execute steps of a method. In the method, training data sets are accessed, where each training data set comprises data associated with a training speech sample of a speaker and a plurality of speaker metrics, where the plurality of speaker metrics include a native language of the speaker. The training data sets are used to train a neural network, where the data associated with each training speech sample is a training input to the neural network, and each of the plurality of speaker metrics is a training output to the neural network. A speech sample of a candidate speaker is received. Data associated with the speech sample is provided to the neural network to generate a vector that contains values for the plurality of speaker metrics that includes a native language value for the candidate speaker based on the speech sample, and the values contained in the vector are compared to values contained in a reference vector associated with a known person to determine whether the candidate speaker is the known person.

As a further example, a computer-readable medium is encoded with instructions for commanding a processing system to implement a method for providing voice authentication of a candidate speaker. In the method, training data sets are accessed, where each training data set comprises data associated with a training speech sample of a speaker and a plurality of speaker metrics, where the plurality of speaker metrics include a native language of the speaker. The training data sets are used to train a neural network, where the data associated with each training speech sample is a training input to the neural network, and each of the plurality of speaker metrics is a training output to the neural network. A speech sample of a candidate speaker is received. Data associated with the speech sample is provided to the neural network to generate a vector that contains values for the plurality of speaker metrics that includes a native language value for the candidate speaker based on the speech sample, and the values contained in the vector are compared to values contained in a reference vector associated with a known person to determine whether the candidate speaker is the known person.

DETAILED DESCRIPTION

Certain embodiments described herein utilize deep learning neural network technology. Deep learning, which can represent high-level abstractions in data with an architecture of multiple non-linear transformation, has been used in automatic speech recognition (ASR). Compared to the conventional HMM-GMM based approach, the aligned pairs of context-dependent decision-tree based tied states (senones)

and corresponding acoustic feature vectors are modeled by DNN instead of GMM, which can benefit from long-span (e.g., 11 frames), high dimensional and strongly correlated input features; highly non-linear mapping functions between input and output features; distributed representation of observed data by the interactions of many hidden factors; and training model parameters discriminatively.

DNN-based approaches are described in certain embodiments herein to improve the performance of speaker recognition. Specifically, certain systems and methods as described herein describe methodologies for speaker recognition on a non-native spontaneous speech corpus for test security. Certain embodiments describe the use of DNN bottleneck features, which can take advantage of phonetically-aware DNN for i-vector training. Noise-aware features and multi-task learning are contemplated in certain embodiments to improve the frame accuracy of senones and '"distill" LI (native language) information of English test-takers, and consequently benefit to a vector (e.g., i-vector) based approach for speaker recognition.

Figure 1:
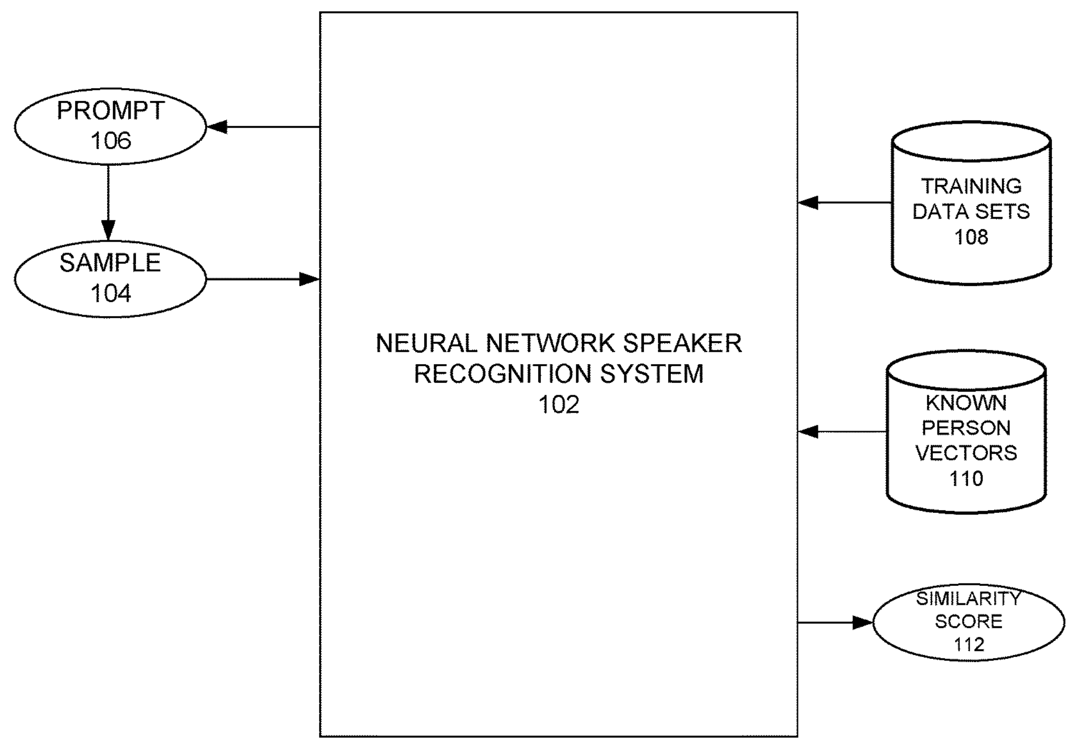
FIG. 1 is a block diagram depicting a processor-implemented neural network speaker recognition system.

FIG. 1 is a block diagram depicting a processor-implemented neural network speaker recognition system. A neural network speaker recognition system 102 is configured to receive a speech sample 104 (e.g., a voice response from an examination participant elicited via a prompt 106) or data associated with a speech sample to perform a voice-based authentication of the speaker using a neural network.

Before receiving the sample 104 from the candidate speaker, the neural network speaker recognition system 102 is trained using a set of training data sets 108. Each training data set includes data associated with a training speech sample of a speaker and a plurality of speaker metrics. Those speaker metrics can be indicative of characteristics of the speaker and the environment of the speaker, where it is desired for the neural network to predict those speaker metrics for a later speech sample when operating in an operational mode (i.e., not a training mode). In one example, the speaker metrics include a native language of the speaker as well as noise characteristics of an environment in which the speech sample was acquired.

Once trained, the sample 104 is received (e.g., after certain pre-processing which may convert a speech recording (e.g., a .wav file) into a data structure describing characteristics of the speech recording), and the received sample is provided to the neural network to generate a vector that contains values for the plurality of speaker metrics (e.g., similar or the same speaker metrics as provided to the neural network during training). In one embodiment, that vector includes a determined native language value for the candidate speaker. That vector is compared to one or more known person vectors 110 to determine whether the candidate speaker is a known person.

Figure 2:
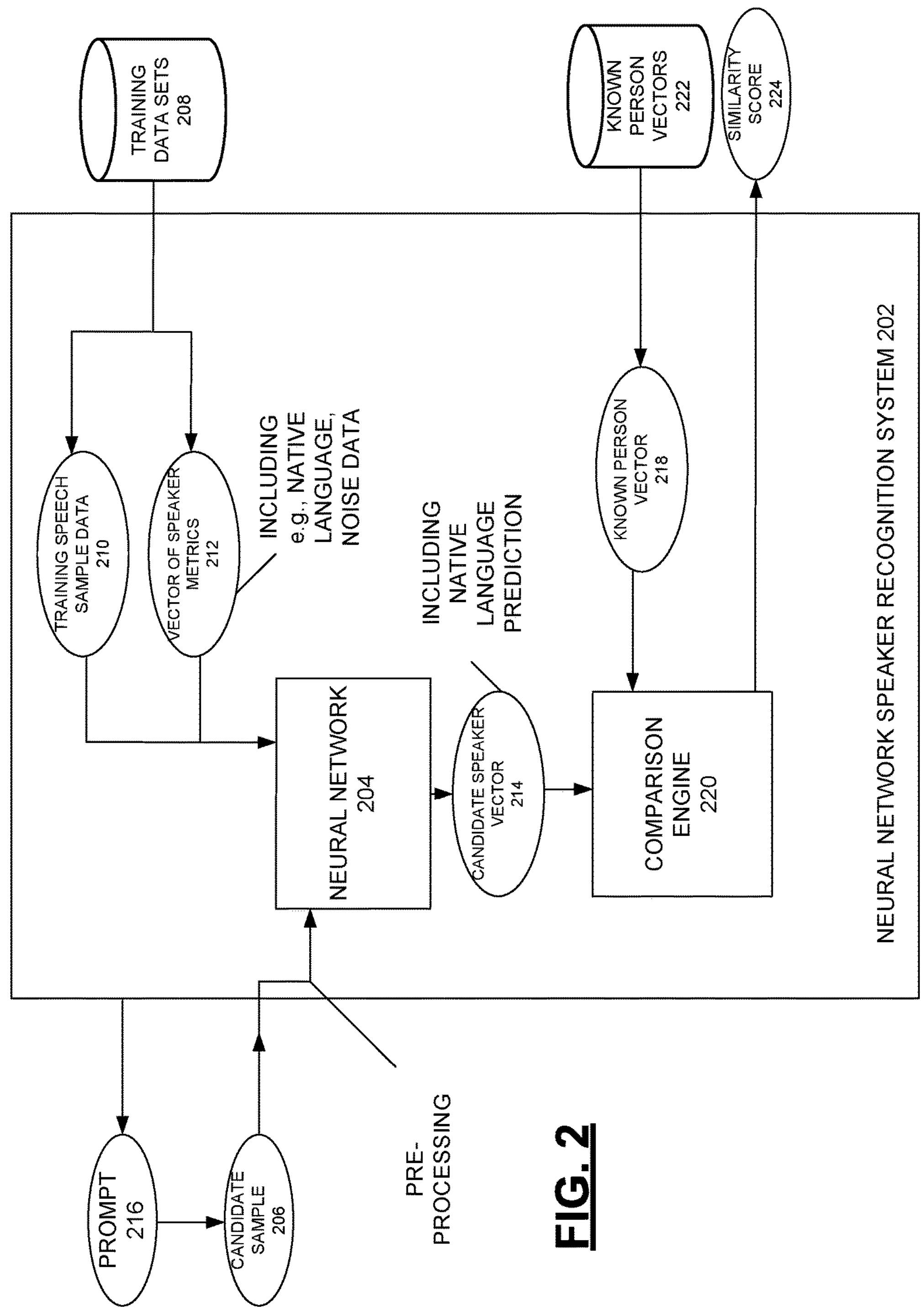
FIG. 2 is a diagram depicting components of a neural network speaker recognition system in one embodiment.

FIG. 2 is a diagram depicting components of a neural network speaker recognition system in one embodiment. The speaker recognition system 202 includes a neural network 204 that is trained to identify a plurality of speaker metrics for a candidate speaker based on a speech sample 206 or data associated with the speech sample 206. The neural network is trained using known data contained in training data sets 208. Each training data set includes data associated with a prior speech sample 210 and a vector 212 of known (e.g., measured or otherwise ascertained) speaker metrics associated with that prior speech sample 210, such as the native language of that speaker, noise characteristics of the environment of that prior speech sample, and acoustic features of that speech sample. The vector of known speaker metrics 212 for a prior speech sample 210 represents intended outputs of the neural network 204 should the neural network 204 be provided the prior speech sample 210 in an operational mode. The neural network 204 is provided a series of training data sets 208 for training, where weights of connections among internal neural network nodes are adjusted throughout the training, with the intent that the final neural network 204 provides output candidate speaker vectors 214 in the operational mode that are as consistent as possible with the prior speech sample/speaker metric vector pairs of the training data sets 208.

In operational mode, the candidate speaker is provided a prompt 216 to speak (e.g., read a provided script or speak extemporaneously, such as on a requested topic). A candidate speech sample 206 is received and may be preprocessed, as described above, before being transmitted to the neural network 204. The neural network 204 processes the data associated with the candidate speech sample 206 and outputs a candidate speaker vector 214 that includes a set of speaker metrics (e.g., that match the format and type of the training speaker metrics 212) that in one embodiment includes a prediction of the native language of the candidate speaker, an indication noise characteristics in the candidate speaker's environment, and acoustic features of the candidate speech sample 206.

The candidate speaker vector 214 is then compared to known person vector(s) 218 by a comparison engine 220 using vectors accessed from a known person vector data store 222 to attempt to match the candidate speaker to a known person. For example, known person vectors may be stored at 222 for each expected test taker of an exam, such that the speaker recognition system 202 can verify that the candidate speaker is who they claim to be. In another example, the known person vector data store 222 contains vectors associated with persons known to have previously participated in fraudulent activity (e.g., data captured during one of their discovered fraudulent acts (e.g., trying to perform a speaking examination for another person)). In that case, the speaker recognition system 202 determines whether or not the candidate speaker is a suspicious person who has previously performed a fraudulent act. In one embodiment, the comparison engine 220 outputs one or more similarity scores indicative of which, if any, known persons having data stored in the known person database 222 the candidate speaker is most similar or a match.

In one embodiment, the candidate speaker vector 214, the training speech vector 212, and the known person vectors 218 are all of a common length (e.g., i-vectors), having the same number of fields/dimensions. In this way, speech samples analyzed by the neural network 204 can be compared to speech samples of known persons regardless of length and other characteristics of the speech samples themselves. That is, vector comparison techniques (e.g., cosine similarity difference operations, linear discriminant analysis operations) can be used to compare speech samples that have disparate lengths and other differing qualities.

Figure 3:
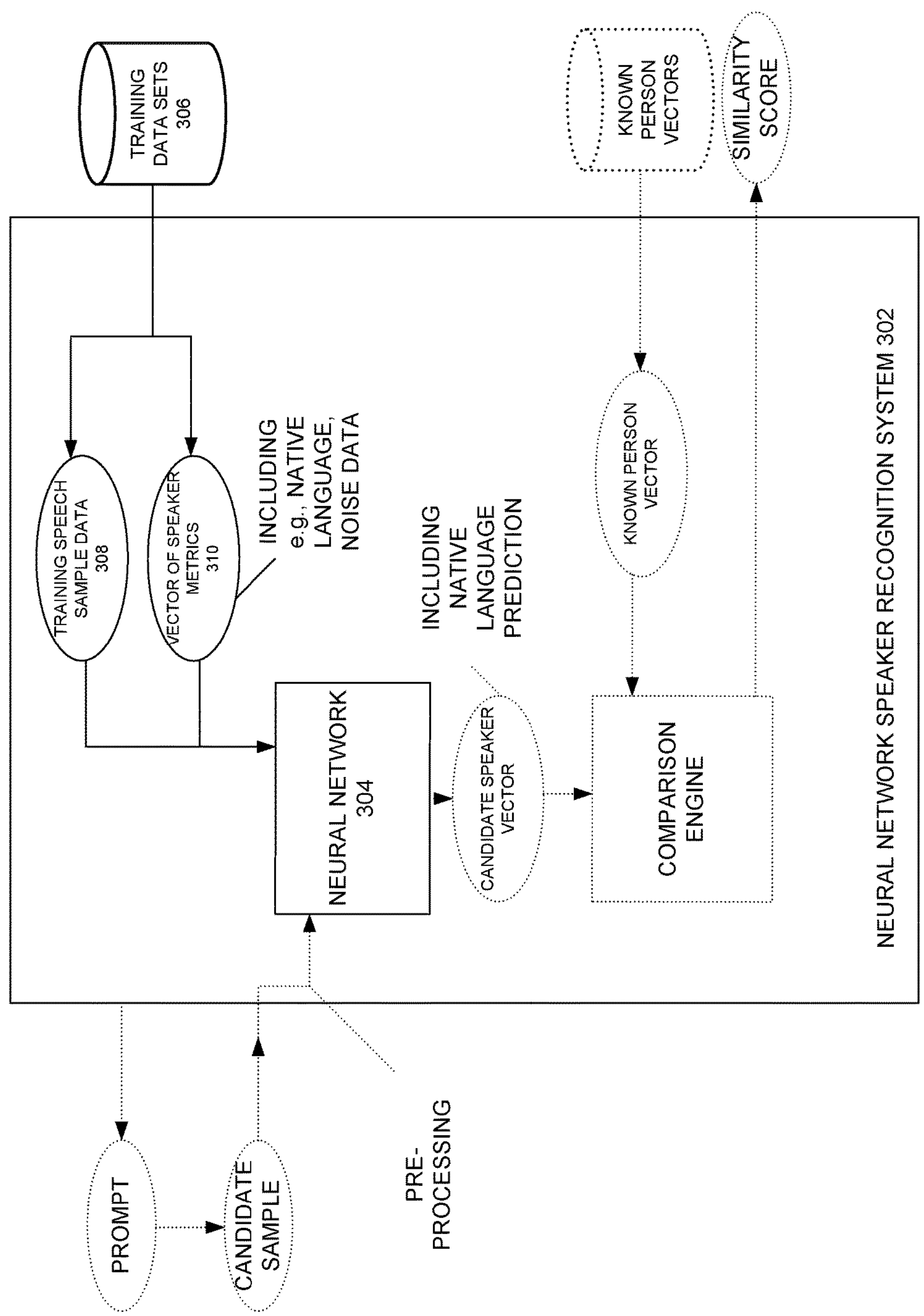
FIG. 3 is a block diagram depicting active components of a neural network speaker recognition system in a training mode.

FIG. 3 is a block diagram depicting active components of a neural network speaker recognition system in a training mode. In a training mode, the speaker recognition system 302 accesses and provides its neural network 304 training data sets from a training data set data store 306. Each training data set comprises data associated with a training speech sample 308 of a speaker and a plurality of speaker metrics 310, which can be accessed in vector form. The speaker metrics can include a variety of features, including a native language of a speaker. The training data sets 308, 310 are used to train the neural network, where the data associated with each training speech sample 308 is a training input to the neural network, and each of the plurality of speaker metrics 310 is a training output to the neural network.

Figure 4:
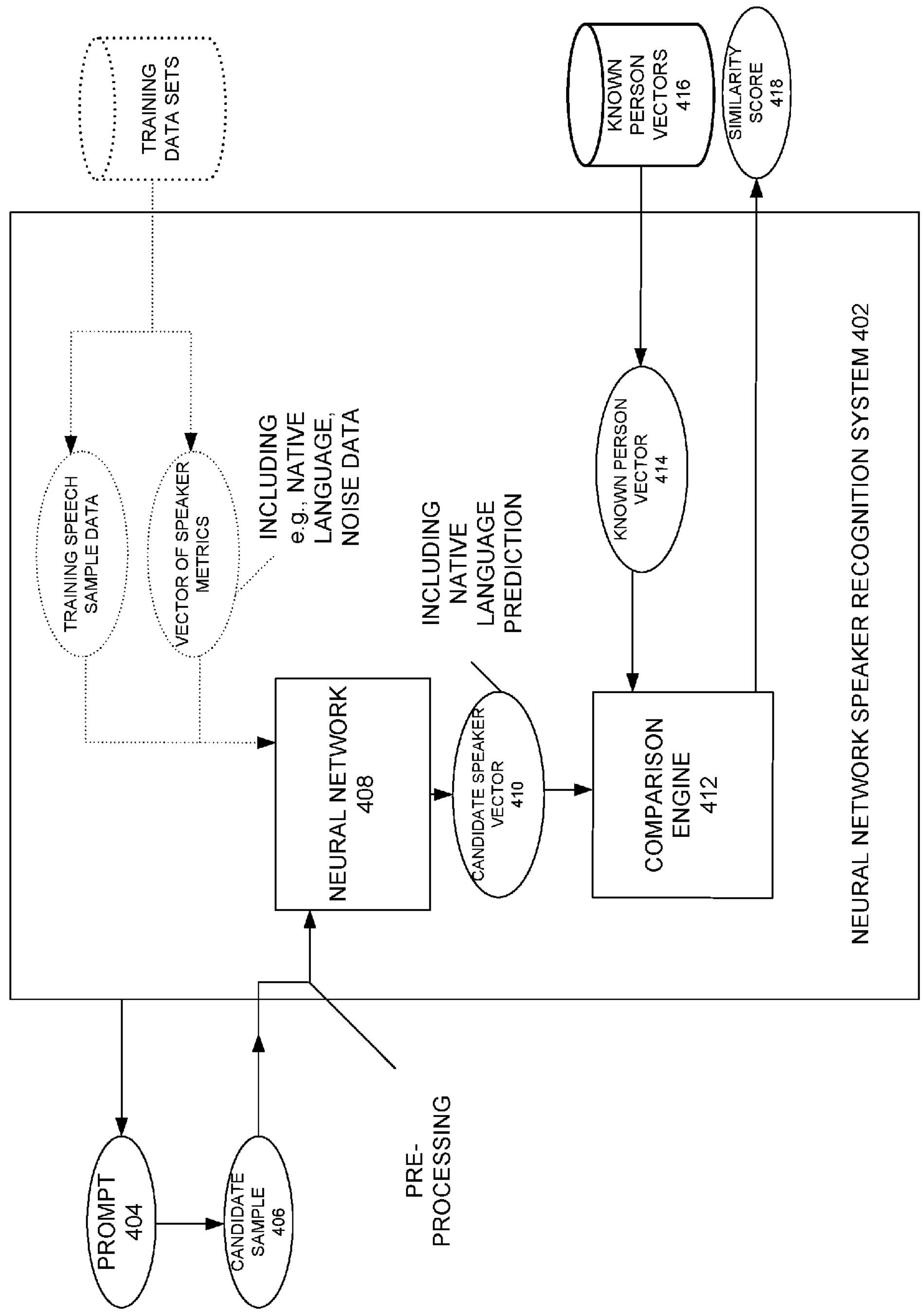
FIG. 4 is a block diagram depicting active components of a neural network speaker recognition system in an operational mode.

FIG. 4 is a block diagram depicting active components of a neural network speaker recognition system in an operational mode. In operational mode, the speaker recognition system 402 or another entity provides a prompt 404 to a candidate speaker to provide a candidate speech sample 406. The speech sample 406 may be pre-processed to generate data associated with the speech sample 406 or may be provided to the neural network 408 directly for analysis. The neural network 408 analyzes the speech sample input and outputs a candidate speaker vector 410 containing determined characteristics of the speech sample, including a prediction as to the native language of the candidate speaker. A comparison engine 412 compares the candidate speaker vector 410 to one or more known person vectors 414 accessed from a known person vector data store 416 to determine whether or how closely the candidate speaker matches any known persons having data stored in the database 416. The comparison engine 412 outputs a similarity score 418 or other indication of matches or lack of matches based on a comparison of the candidate speaker vector 410 and the known person vectors 414.

Neural network speaker recognition systems can take a variety of forms. In one example, i-vectors are utilized, where an i-vector is a compact representation of a speech utterance in a low-dimensional subspace. In an i-vector model, a given speaker- and channel-dependent supervector M can be modeled as:

$$M=m+Tw$$

where m represents a speaker- and channel-independent supervector, which can be estimated by UBM, e.g., GMM; T, a low rank matrix, represents total variability space; and the components of the vector w are total factors, segment-specific standard normal-distributed vectors, also called i-vectors, and estimated by maximum a posterior (MAP). The matrix T is estimated by an EM algorithm.

In one example, speech utterances are first converted to a sequence of acoustic feature vectors, typically 20 dimensional mel-frequency cepstral coefficients (MFCC) and their dynamic counterparts; after that speaker- and channel-independent super-vectors, which accumulate zeroth, first, and second order sufficient statistics, are computed by using the posterior probabilities of the classes from a pre-trained GMM-UBM; next a total variability matrix, T, is used to transform the super-vectors to the low dimensional i-vectors, which contains both speaker and channel variabilities; then linear discriminant analysis (LOA) is often used to do channel compensation; finally a score between target and test (or impostor) is calculated by scoring functions, e.g. probabilistic LOA (PLOA) for further compensation or a cosine distance.

A deep learning neural network (DNN) is a feed-forward, artificial neural network with multiple hidden layers between its input and output. For each hidden unit, a nonlinear activation function is used to map all inputs from the lower layer to a scalar state, which is then fed to the upper layer. Generally a system uses a sigmoid function as its activation function. Weights and bias are generally initialized in pretraining, and then trained by optimizing a cost function which measures the discrepancy between target vectors and the predicted output with the back-propagation (BP) procedure. The DNN is trained by using batch gradient descent. It is optimized by a "minibatch" based stochastic gradient ascent algorithm.

It has been discovered that a phonetically-aware DNN can be used for acoustic modeling in automatic speech recognition (ASR). There, acoustic features along with contextual-dependent phone sequence are firstly modeled by conventional GMM-HMMs. In practice, limited by insufficient training data, systems usually cluster models of contexts into generalized ones to predict unseen contexts in test robustly. State tying via a clustered decision tree is commonly used. Then the aligned pairs of HMM tied states (senones) and corresponding acoustic feature vectors (GMM-HMM is used for forced alignment) are modeled by DNN.

In one example, a phonetically-aware DNN is used for speaker recognition, which mainly replaces GMM components with senones and utilizes the corresponding posteriors from senones to extract Baum-Welch statistics. DNN models phonetic content (senones) in a supervised learning manner. It allows the comparison among different speakers at the same phonetic content and then makes it easier to distinguish one speaker from the others than GMM-UBM, in which the classes may be phonetically indistinguishable due to the training in an unsupervised way. In addition, even if both DNN and GMM are trained by supervised learning, DNN can capture a much longer span of adjacent frames and estimate model parameters discriminatively, which can get more accurate posterior estimation than GMM.

In one example, bottleneck features (BNFs) are generated from a DNN where one of the hidden layers has a small number of units, compared to the other layers. It compresses the classification related information into a low dimensional representation. The activations of a narrow hidden bottleneck (BN) layer are used as feature vectors to train a standard GMM-HMM. BN features can improve ASR accuracy but not perform as well as the best DNN based system, in some instances, because the BNFs from the middle layer of DNN degrade the frame accuracy of the senones. However, an approach of using DNN trained by subset of training set as feature extractor and the resulted features from whole training set used for GMM-HMM often achieves better performance than DNN-HMM. In addition, stacked BN, in which the second level consists of a merger NN fusing the posteriors from the first level, and linear activation function, which performs like a LDA or PCA transformation on the activations of previous layer, outperforms the DNN based approaches in some instances.

The DNN BNFs extracted from second last liner layer are used as acoustic features to train GMM-UBM for speaker recognition. It shows the system with BNF achieves a better performance in EER than that of just using output posteriors of DNN for extracting Baum-Welch statistics. It assumes that the loss of information at the BNFs is not too much to affect the posterior prediction. The DNN bottleneck features have the same phonetically-aware benefits as those of DNN posteriors since the BNFs are already precisely mapped to a senones-dependent space in one example. In addition, BNFs sometimes carry more speaker- relevant information than DNN output posteriors, which aim at being speaker independent. Furthermore, the GMM posteriors estimated from BNFs can be more general than those of DNN, which learns senones posteriors directly and produces a sharp posterior distribution.

In one example, a system utilizes a DNN in a speaker recognition task, which is carried on a non-native spontaneous speech corpus. DNN has many advantages over GMM for acoustic modeling. There is no underlying assumption of distribution and modality for input data in the DNN, e.g., continuous and binary features can be augmented and modeled together naturally. The deep learning technologies, e.g., transfer learning or multi-task learning, which can exploit the commonalities between the training data of different learning tasks so as to transfer learned knowledge across them, can also be applied to acoustic modeling. It also shows that the noise-aware or room-aware DNN training, which appends noise or reverberation information to input feature vectors, can reduce word error rate (WER) in noisy or reverberant speech recognition tasks. Multi-task learning is also successfully employed to improve phoneme recognition and multilingual speech recognition.

Figure 5:
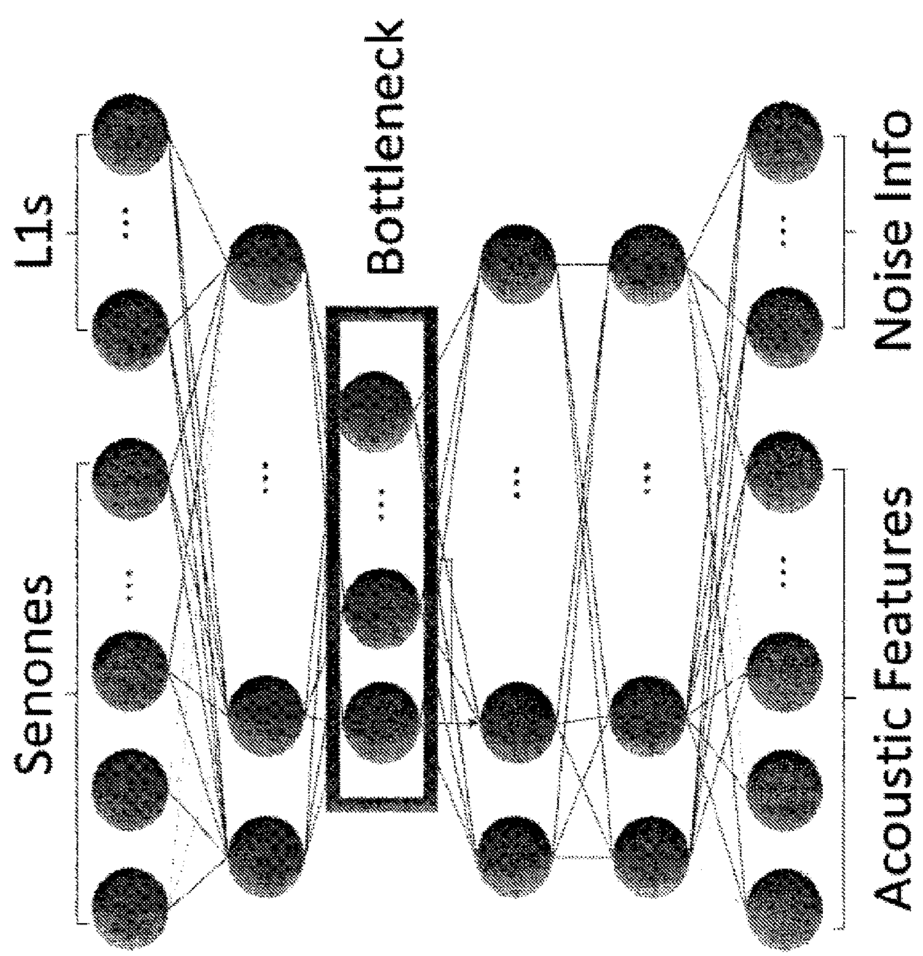
FIG. 5 is a diagram depicting a deep learning neural network structure that can be implemented in one example.

Certain examples use metadata to enhance BNFs training for non-native speaker recognition. The structure of DNN used in these examples is illustrated in FIG. 5, where noise-aware input feature vectors and multi-task learning are employed. If o represents observed feature vector, which is used as input vector for DNN training, it is formed as, $$o_t=[x_{t-T}, \ldots ,x_{t-1},x_t,x_{t+1}, \ldots ,x_{t+T},n_1]$$

where t is the frame index; T is the number of frame for sliding window; and n is the noise estimation. The example system assumes that the noise is stationary per test-taker's utterance, n, is approximated by the average of the beginning and ending frames and fixed over utterance. In FIG. 5, there are two tasks included, the primary one is phonetic content senones classification and the auxiliary one is test takers' L1s (native language) classification. The objective function used in multi-task learning is $$\Gamma = a\sum_t \ln p(s_t \mid o_t) + (1-a)\sum_t \ln p(l_t \mid o_t)$$

where $s_t$ and $l_t$ are senone label and L1 label at t-th frame, separately. a is the weight for the task.

Figure 6:
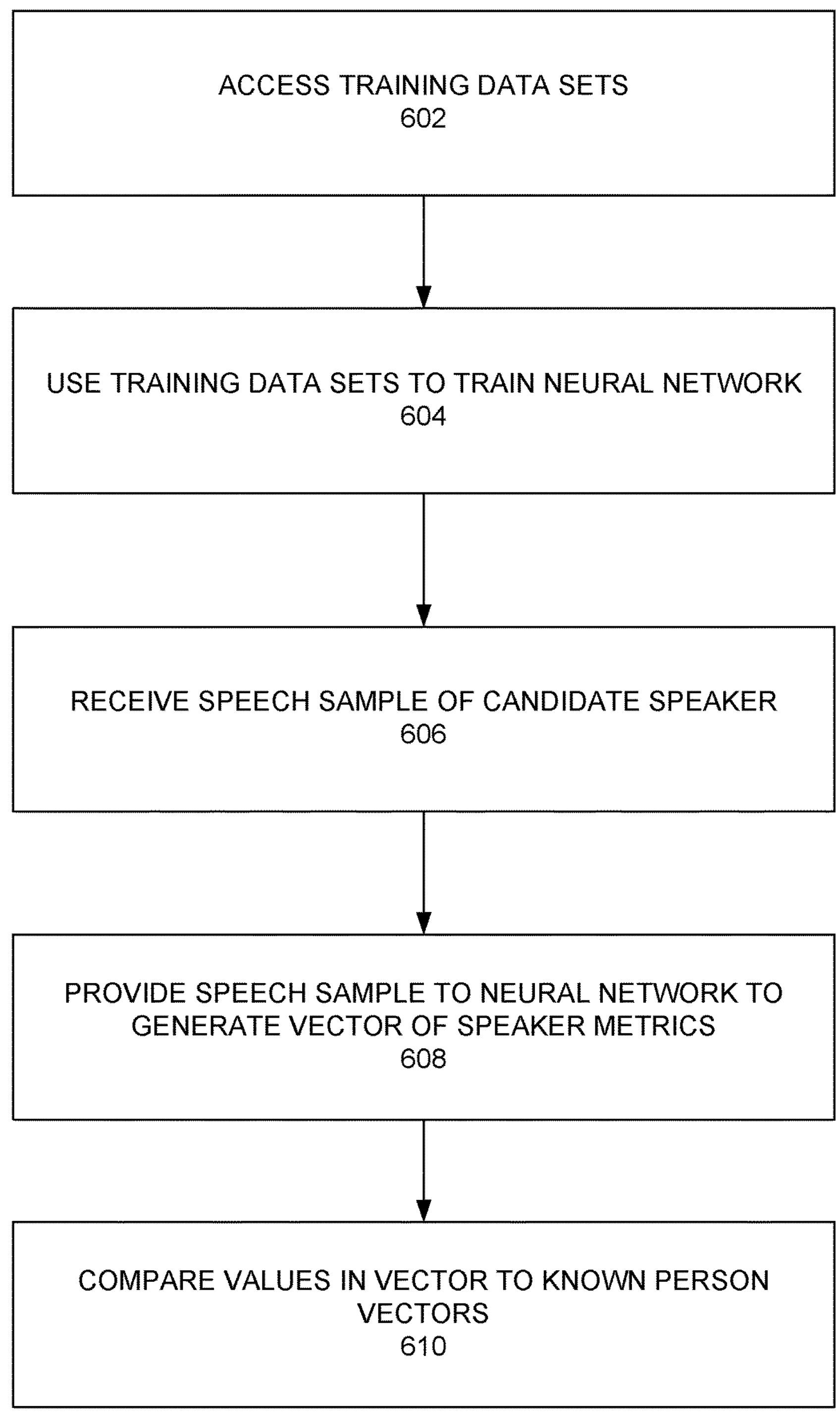
FIG. 6 is a flow diagram depicting a processor-implemented method for providing voice authentication of a candidate speaker.

FIG. 6 is a flow diagram depicting a processor-implemented method for providing voice authentication of a candidate speaker. Training data sets are accessed at 602, where each training data set comprises data associated with a training speech sample of a speaker and a plurality of speaker metrics, where the plurality of speaker metrics include a native language of the speaker. The training data sets are used to train a neural network at 604, where the data associated with each training speech sample is a training input to the neural network, and each of the plurality of speaker metrics is a training output to the neural network. A speech sample of a candidate speaker is received at 606. Data associated with the speech sample is provided to the neural network at 608 to generate a vector that contains values for the plurality of speaker metrics that includes a native language value for the candidate speaker based on the speech sample, and the values contained in the vector are compared to values contained in a reference vector associated with a known person to determine whether the candidate speaker is the known person at 610.

Figure 7A:
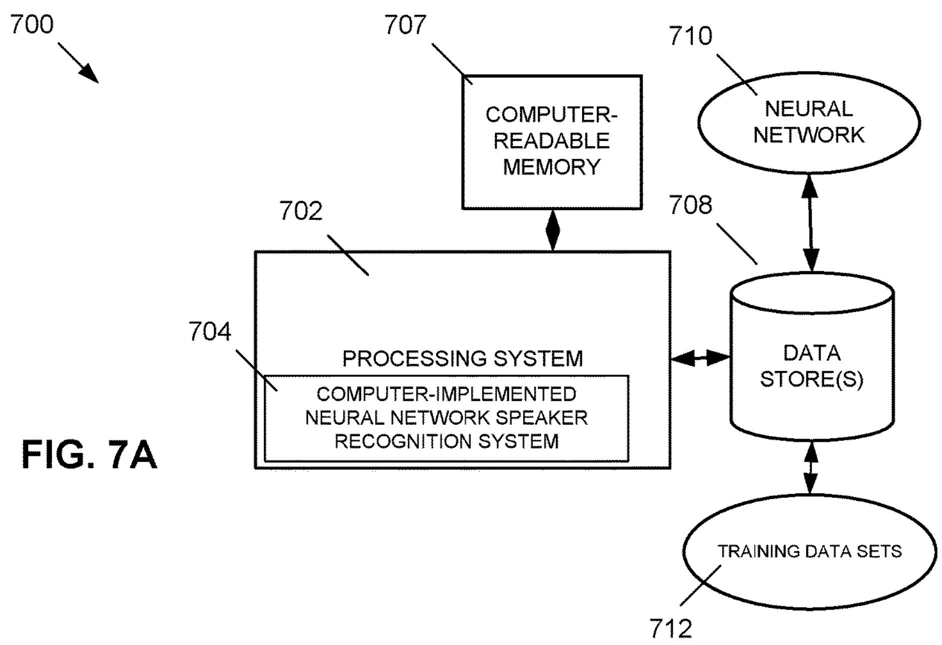
FIGS. 7A, 7B, and 7C depict example systems for implementing the approaches described herein for implementing a computer-implemented neural network speaker recognition system.
Figure 7B:
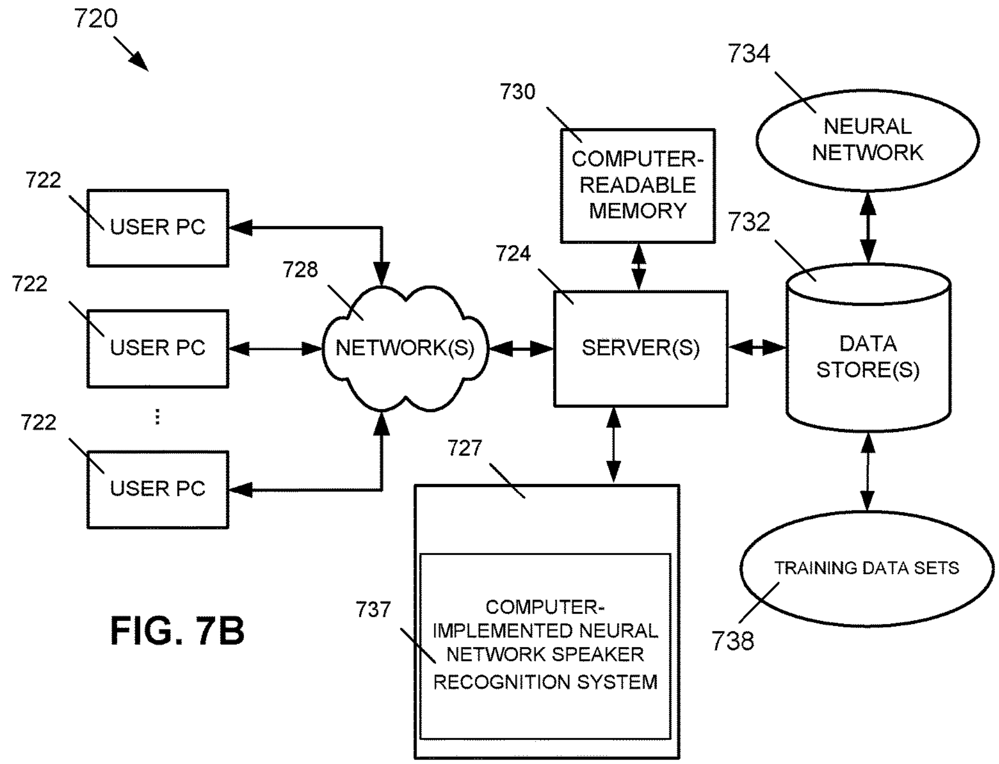
Figure 7C:
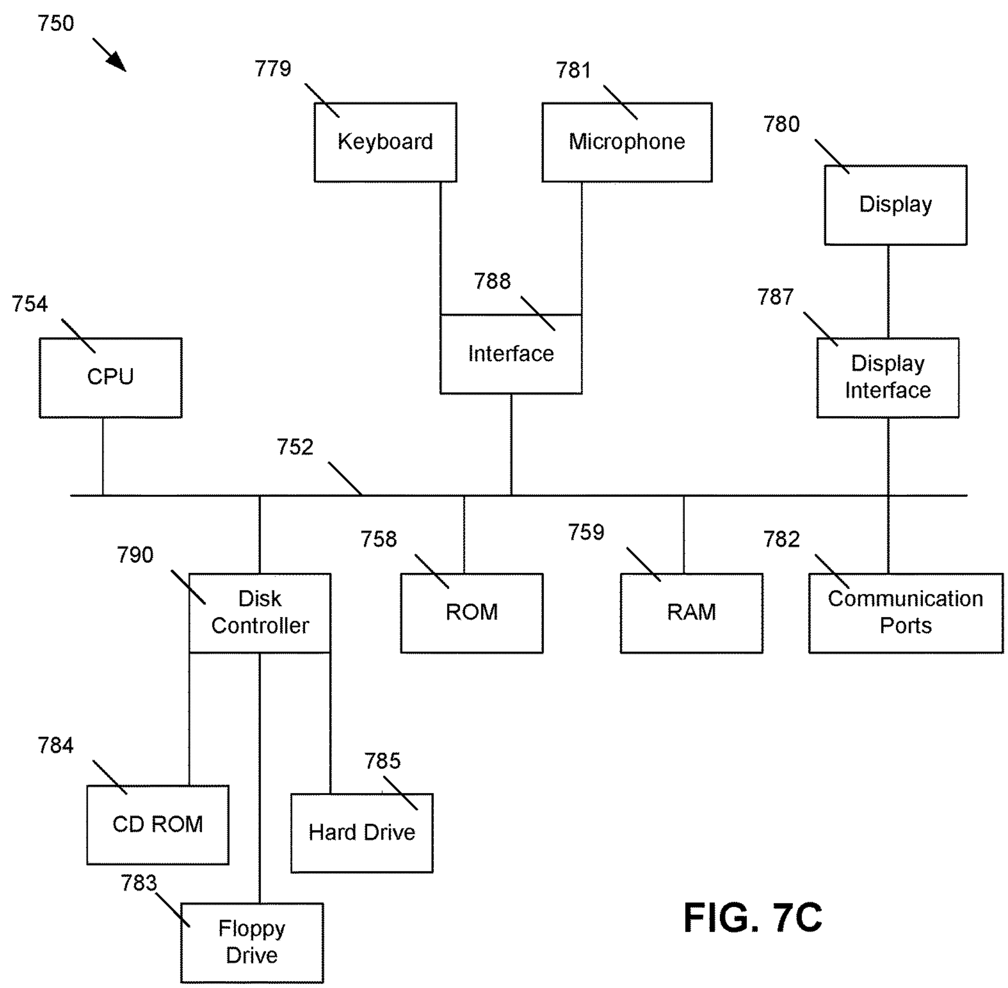

FIGS. 7A, 7B, and 7C depict example systems for implementing the approaches described herein for implementing a computer-implemented neural network speaker recognition system. For example, FIG. 7A depicts an exemplary system 700 that includes a standalone computer architecture where a processing system 702 (e.g., one or more computer processors located in a given computer or in multiple computers that may be separate and distinct from one another) includes a computer-implemented neural network speaker recognition system 704 being executed on the processing system 702. The processing system 702 has access to a computer-readable memory 707 in addition to one or more data stores 708. The one or more data stores 708 may include neural networks 710 as well as training data sets 712. The processing system 702 may be a distributed parallel computing environment, which may be used to handle very large-scale data sets.

FIG. 7B depicts a system 720 that includes a client-server architecture. One or more user PCs 722 access one or more servers 724 running a computer-implemented neural network speaker recognition system 737 on a processing system 727 via one or more networks 728. The one or more servers 724 may access a computer-readable memory 730 as well as one or more data stores 732. The one or more data stores 732 may include neural networks 734 as well as training data sets 738.

FIG. 7C shows a block diagram of exemplary hardware for a standalone computer architecture 750, such as the architecture depicted in FIG. 7A that may be used to include and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 758 and random access memory (RAM) 759, may be in communication with the processing system 754 and may include one or more programming instructions for performing the method of implementing a computer-implemented neural network speaker recognition system. Optionally, program instructions may be stored on a non-transitory computer-readable storage medium such as a magnetic disk, optical disk, recordable memory device, flash memory, or other physical storage medium.

In FIGS. 7A, 7B, and 7C, computer readable memories 708, 730, 758, 759 or data stores 708, 732, 783, 784, 788 may include one or more data structures for storing and associating various data used in the example systems for implementing a computer-implemented neural network speaker recognition system. For example, a data structure stored in any of the aforementioned locations may be used to store data from XML files, initial parameters, and/or data for other variables described herein. A disk controller 790 interfaces one or more optional disk drives to the system bus 752. These disk drives may be external or internal floppy disk drives such as 783, external or internal CD-ROM, CD-R, CD-RW or DVD drives such as 784, or external or internal hard drives 785. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 790, the ROM 758 and/or the RAM 759. The processor 754 may access one or more components as required.

A display interface 787 may permit information from the bus 752 to be displayed on a display 780 in audio, graphic, or alphanumeric format. Communication with external devices may optionally occur using various communication ports 782.

In addition to these computer-type components, the hardware may also include data input devices, such as a keyboard 779, or other input device 781, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A processor-implemented method of providing voice authentication of a candidate speaker, comprising:

accessing training data sets, wherein each training data set comprises data associated with a training speech sample of a speaker and a plurality of speaker metrics, wherein the plurality of speaker metrics include a native language of the speaker;

using the training data sets to train a neural network, wherein the data associated with each training speech sample is a first training input to the neural network, and each of the plurality of speaker metrics is a second training input to the neural network, wherein the neural network is trained by executing a first task associated with a phonetic content senones classification and a second task associated with a native language classification, and wherein a relationship between the first task and the second task is parametric;

receiving a speech sample of a candidate speaker;

providing data associated with the speech sample to the neural network to generate a vector that contains values for the plurality of speaker metrics that includes a native language value for the candidate speaker based on the speech sample; and comparing the values contained in the vector to values contained in a reference vector associated with a known person to determine whether the candidate speaker is the known person.

2. The method of claim 1, wherein the vector comprises a data structure, wherein vectors for the candidate speaker and all known person have a common, fixed number of fields.

3. The method of claim 1, wherein the reference vector associated with the known person is generated based on a known person speech sample.

4. The method of claim 3, wherein the reference vector associated with the known person is generated by providing data associated with the known person speech sample to the neural network.

5. The method of claim 3, wherein the known person speech sample and the speech sample of the candidate speaker are of different time lengths.

6. The method of claim 1, wherein the known person is an expected person or the known person is a person known to have performed a fraudulent act in the past.

7. The method of claim 1, wherein the candidate speaker is an examinee before or after an examination.

8. The method of claim 2, wherein the reference vector associated with the known person is based on a prior speech sample from the candidate speaker.

9. The method of claim 1, wherein the neural network is a deep neural network.

10. The method of claim 1, wherein the values contained in the vector to values contained in a reference vector are compared using a cosine similarity distance operation or a linear discriminant analysis operation.

11. The method of claim 1, wherein the plurality of speaker metrics include a noise metric.

12. The method of claim 11, wherein the noise metric is associated with a location where the speech sample was captured.

13. The method of claim 1, wherein the speaker metrics used to populate the vector for the candidate speaker are all extracted from a particular layer of the neural network.

14. A system for providing voice authentication of a candidate speaker, comprising:

a processing system comprising one or more data processors;

one or more computer-readable memories encoded with instructions for commanding the processing system to execute steps of a method, the method including:

accessing training data sets, wherein each training data set comprises data associated with a training speech sample of a speaker and a plurality of speaker metrics, wherein the plurality of speaker metrics include a native language of the speaker;

using the training data sets to train a neural network, wherein the data associated with each training speech sample is a first training input to the neural network, and each of the plurality of speaker metrics is a second training input to the neural network, wherein the neural network is trained by executing a first task associated with a phonetic content senones classification and a second task associated with a native language classification, and wherein a relationship between the first task and the second task is parametric;

receiving a speech sample of a candidate speaker;

providing data associated with the speech sample to the neural network to generate a vector that contains values for the plurality of speaker metrics that includes a native language value for the candidate speaker based on the speech sample; and comparing the values contained in the vector to values contained in a reference vector associated with a known person to determine whether the candidate speaker is the known person.

15. The system of claim 14, wherein the vector comprises a data structure, wherein vectors for the candidate speaker and all known person have a common, fixed number of fields.

16. The system of claim 14, wherein the reference vector associated with the known person is generated based on a known person speech sample.

17. The system of claim 16, wherein the reference vector associated with the known person is generated by providing data associated with the known person speech sample to the neural network.

18. The system of claim 16, wherein the known person speech sample and the speech sample of the candidate speaker are of different time lengths.

19. The system of claim 14, wherein the candidate speaker is an examinee before or after an examination.

20. A non-transistory computer-readable medium encoded with instructions for commanding one or more data processors to execute steps of a method for providing voice authentication of a candidate speaker, the steps comprising:

accessing training data sets, wherein each training data set comprises data associated with a training speech sample of a speaker and a plurality of speaker metrics, wherein the plurality of speaker metrics include a native language of the speaker;

using the training data sets to train a neural network, wherein the data associated with each training speech sample is a first training input to the neural network, and each of the plurality of speaker metrics is a second training input to the neural network, wherein the neural network is trained by executing a first task associated with a phonetic content senones classification and a second task associated with a native language classification, and wherein a relationship between the first task and the second task is parametric;

receiving a speech sample of a candidate speaker;

providing data associated with the speech sample to the neural network to generate a vector that contains values for the plurality of speaker metrics that includes a native language value for the candidate speaker based on the speech sample; and comparing the values contained in the vector to values contained in a reference vector associated with a known person to determine whether the candidate speaker is the known person.

21. The method of claim 1, wherein the parametric relationship between the first task and the second task is characterized by an assumed probability distribution between the first task and the second task.

* * * * *